UNITED STATES PATENT OFFICE.

CHARLES M. BOWMAN, OF LEBANON, PENNSYLVANIA.

COMPOSITION FOR PRODUCING ARTIFICIAL RUST.

1,215,471.

Specification of Letters Patent. Patented Feb. 13, 1917.

No Drawing. Application filed September 17, 1915. Serial No. 51,263.

*To all whom it may concern:*

Be it known that I, CHARLES M. BOWMAN, a citizen of the United States, residing at Lebanon, in the county of Lebanon and State of Pennsylvania, have invented certain new and useful Improvements in Compositions for Producing Artificial Rust; and I do hereby declare the following to be a full, clear, and exact description of the invention, such as will enable others skilled in the art to which it appertains to make and use the same.

The invention relates to improvements in compositions for the production of artificial rust, and has for its object to provide an artificial coating of rust for the protection of exposed metallic surfaces against the formation of natural, destructive rust, and for the joining together of abutting metallic surfaces in a manner to prevent their separation under ordinary strains or stresses to which they may be subjected, without destroying or otherwise injuring the further or future use of the articles or surfaces to which the composition has been applied.

The invention resides particularly in the production of artificial rust by combining certain well known inexpensive ingredients into a semi-liquid or pasty condition, and then applying the reaction products of said ingredients to the same, in any desired manner, to the exposed or joined surfaces to be coated or firmly secured together.

In the production of the composition, the several ingredients of the same are, for all practical purposes, used in the following proportions, but which proportions may be varied to any desired degree, without departing from the spirit of the invention:— finely comminuted iron, or other similar metallic substances, fifty (50) parts; ammonium chlorid, four (4) parts; sulfur, two (2) parts; admixed with diluted acetic acid, approximately ten per cent. (10%) strength, in sufficient quantity to make a relatively thick, semi-liquid, or pasty mass.

The composition is applied in a manner to cover or coat the surface or joint, to be treated, the thickness of the application of the same depending upon the probable strain or stress, in the case of a joining together of abutting or other connected surfaces, to which the same is to be subjected, and will harden, for all practical purposes, within a period of twenty-four hours.

It is obvious that the uses to which the invention are applicable, are practically limitless, and is especially adapted for securing nuts firmly in position on bolts, or joining other metallic surfaces having threaded surfaces, as the action of the acid, in the composition effects an assimilation of the particles of the metallic substance, with the ammonium chlorid and sulfur, into a relatively hard and compact mass, and one which adheres firmly to the surfaces to which it is applied.

Having thus fully described the invention, what is claimed, is:—

1. A composition for producing artificial rust as a binding agent between metallic surfaces, consisting of the reaction products of iron, ammonium chlorid, sulfur and an acid, substantially in the proportions described.

2. A composition for producing artificial rust as a binding agent between metallic surfaces, and as a preventive for the formation of destructive natural rust on said surfaces, consisting of the reaction products of finely comminuted iron, fifty (50) parts; ammonium chlorid, four (4) parts; sulfur, two (2) parts, and a ten per cent. (10%) solution of acetic acid in sufficient quantity to make a semi-liquid or pasty mass.

In testimony whereof I affix my signature in presence of two witnesses.

CHARLES M. BOWMAN.

Witnesses:
C. S. BENDER,
GEO. SCHROFF.